United States Patent [19]
Choi et al.

[11] Patent Number: 5,955,568
[45] Date of Patent: Sep. 21, 1999

[54] PROCESS FOR PREPARING POLYAMIDEIMIDE RESINS BY DIRECT POLYMERIZATION

[75] Inventors: Kil-Yeong Choi; Dong-Hack Suh; Mi-Hie Yi; Young-Taik Hong; Moon-Young Jin, all of Daejeon, Rep. of Korea

[73] Assignee: Korea Research Institute of Chemical Technology, Daejeon, Rep. of Korea

[21] Appl. No.: 08/956,923

[22] Filed: Oct. 23, 1997

Related U.S. Application Data

[63] Continuation of application No. 08/635,712, Apr. 22, 1996, abandoned.

[51] Int. Cl.$^6$ .......................... C08G 69/28; C08G 73/14
[52] U.S. Cl. ......................... 528/351; 528/170; 528/174; 528/188; 528/352
[58] Field of Search .................................. 528/170, 174, 528/188, 352, 351

[56] References Cited

U.S. PATENT DOCUMENTS

| | | | |
|---|---|---|---|
| 3,541,038 | 11/1970 | Nakano et al. | 524/708 |
| 3,860,559 | 1/1975 | Minami et al. | 528/188 |
| 3,920,612 | 11/1975 | Stephens | 528/188 |
| 4,016,140 | 4/1977 | Morello | 528/188 |
| 4,066,631 | 1/1978 | Dimmig | 528/188 |
| 5,104,967 | 4/1992 | Sheppard et al. | 528/322 |
| 5,532,334 | 7/1996 | Choi et al. | 528/351 |
| 5,587,452 | 12/1996 | Koning et al. | 528/170 |

FOREIGN PATENT DOCUMENTS

| | | |
|---|---|---|
| 1 515066 | 12/1965 | France . |
| 44-19274 | 8/1969 | Japan . |
| 46-15513 | 4/1971 | Japan . |
| 58-180532 | 10/1983 | Japan . |
| 62-297329 | 12/1987 | Japan . |
| 63-108027 | 5/1988 | Japan . |
| 63-27527 | 6/1988 | Japan . |
| 64-51438 | 2/1989 | Japan . |
| 218422 | 1/1990 | Japan . |
| 2-115229 | 4/1990 | Japan . |
| 2115229 | 4/1990 | Japan . |

OTHER PUBLICATIONS

Makromol. Chem. Rapid Commun. 2, pp. 649–653 (1981).

*Primary Examiner*—Tae Yoon
*Attorney, Agent, or Firm*—Ladas & Parry

[57] ABSTRACT

The disclosure describes a process for preparing a polyamideimide resin having high molecular weight in a simple manner wherein major problems of the prior processes such as low heat resistance and low melt flowability are improved. The process comprises condensation of an aromatic tricarboxylic acid anhydride and an aromatic diamine in a polar solvent, subjecting the resulting diimidedicarboxylic acid to acyl halogenating agent treatment to give an intermediate having good reactivity at low temperature, and then subjecting the latter to direct polymerization by using diamine as a nucleophilic agent to give a polyamideimide resin having high molecular weight. The polyamideimide resin prepared by the present invention can be used as major heat resistant structural material in advanced industries and as paint, sheet, adhesives, sliding material, fiber and film having heat resistance.

23 Claims, 3 Drawing Sheets

PROCESS FOR PREPARING POLYAMIDEIMIDE RESINS BY DIRECT POLYMERIZATION

This is a continuation of application Ser. No. 08/635,712 filed Apr. 22, 1996, now abandoned.

FIELD OF THE INVENTION

The present invention relates to a process for preparing polyamideimide resins, which has economic merit. More specifically, it relates to a process for preparing polyamideimide resins having high molecular weights in a high yield and in a simple manner at a relatively low temperature for a short time.

BACKGROUND OF THE INVENTION

The molecular structures of the polyamideimide resin vary depending on the monomers employed. Typical example thereof is that represented by the following formula (I)

wherein R is prepared by polycondensation of trimellitic acid anhydride (or its derivatives) as an aromatic tricarboxylic acid component with m-phenylene diamine and diaminodiphenyl ether as an aromatic diamine component.

Polyamideimide resin of the formula (I) is disclosed in U.S. Pat. No. 4,016,140 and Japanese Patent Laid-Open No. Hei 02-18,422. It is a transparent, amorphous resin which has the following properties:

(1) It has high heat distortion temperature of 278° C. and a long term service temperature exceeding 200° C. It has excellent heat resistance. So it can be used in wide range of temperature up to 260° C.

(2) Even at high temperature exceeding 200° C., it has excellent physical and mechanical properties, which are comparable to those of general purpose engineering plastics at room temperature. Moreover, it has good impact resistance.

(3) It has outstanding creep resistance.

(4) It has very low linear expansion coefficient of $4 \times 10^{-5}$ cm/cm. °C., which can be further reduced to less than half by using fillers.

(5) It has excellent electrical breakdown strength and volume resistivity, and shows flame retardance of UL 94 V-O without using flame retardants.

(6) If polyamideimide is compounded with PTFE or graphite, it shows good abrasion resistance and self lubricating properties. Therefore, it is suitable as sliding member under severe circumstance.

(7) It has good chemical resistance. That is, it is fairly stable in hydrocarbons. But care must be taken for concentrated aqueous alkali solution.

(8) It has good ultraviolet light resistance and radiation resistance.

Examples of the methods for preparing polyamideimide resins generally include the isocyanate method and acid chloride method.

The isocyanate method comprises the condensation of aromatic diisocyanate with aromatic tricarboxylic acid anhydride to give polyamideimide without via polyamic acid which is intermediate polymer as disclosed in Japanese Patent Publication No. Sho 44-19274 and U.S. Pat. No. 3,541,038 (1970).

The acid chloride method comprises the condensation of aromatic tricarboxylic acid chloride with aromatic diamine. This method is classified into "low temperature homogeneous solution polymerization method" and "low temperature precipitating polymerization method". The typical example of the low temperature homogeneous solution polymerization method comprises the polymerization reaction at room temperature in nonaqueous polar solvent such as N,N'-dimethylacetamide which was developed by Standard Oil Co., in the U.S.A as disclosed in U.S. Pat. No. 3,920,612 (1975). The typical example of the low temperature precipitating polymerization method comprises the polymerization reaction in an organic solvent which is sparingly soluble in water, such as methyl ethyl ketone (for example, produced by Teijin Kasei Corp. in Japan) and in an aqueous solvent by using triethylamine as an acid acceptor as disclosed in Japanese Patent Publication No. Sho 46-15,513. This reaction is a kind of interfacial polymerization method.

Another method of preparing polyamideimide resin is the direct polymerization method which comprises direct polymerization of aromatic diamine with aromatic tricarboxylic acid in the presence of dehydration catalyst as disclosed in U.S. Pat. No. 3,860,559 (1975) and Japanese Patent Laid-Open No. Sho 58-180532.

However, the isocyanate method has problems in that gelation occurs during the reaction and it is difficult to get linear high molecular weight polymers due to the formation of by-products. Therefore, the polyamideimide resin prepared by this method have poor melt flowability, melt processability, mechanical properties, and heat resistance, and thus is not suitable for application as injection molded articles.

Although it is possible to obtain sufficiently high molecular weight polyamideimide by the low temperature homogeneous solution polymerization method, you should have to use acid chloride as the raw material which is 5 to 10 times expensive than corresponding acid. Therefore, the price of the resulting polyamideimide is very high. Furthermore, since this method is carried out in two steps consisting of preparing polyamic acid as a primary polymer and then imidization of the latter by heating or by using dehydration agent. Moreover, this method also has a problem in that the modification of the molecular structure of the resins is almost impossible. Thus this method has little economic merit.

In the low temperature precipitating polymerization method, the expensive acid chloride is also used as the raw material. And the polyamic acid is precipitated out using water/methyl ethyl ketone mixed non solvent followed by cyclization. The polyamideimide resin prepared by this method has lower molecular weight with a large molecular weight distribution. Thus, the method is also impractical.

Both the isocyanate method and acid chloride method have disadvantages in that the handling of acid chloride and diisocyanate is troublesome since acid chloride and diisocyanate are sensitive to water, which should be blocked in the reaction process.

Meanwhile, the direct polymerization method of polyamideimide resins comprises directly polymerizing the aromatic diamine with aromatic tricarboxylic acid anhydride (or its derivatives) in the presence of polymerization dehydrating catalyst. The advantages of this polymerization method are that the process of this method is simplest among many preparing processes, the cost for raw materials and processing is not high, and that the handling of monomers is easy. For these reasons active researches have been made in this field. The examples of polymerization catalyst used in the method are phosphoric acid types such as phosphoric acid and polyphosphoric acid (Japanese Patent Publication Nos. Sho 63-27,527, Japanese Patent laid-open Nos. Sho 62-297,329 and Sho 63-108,027 and Japanese Patent Laid-open No. Hei 02-115,229), boric acid types such as boric acid and boric acid anhydride (French Patent No. 1,515,066 and Japanese Patent Laid-Open No Sho 58-180,532) or triphenyl phosphite and phosphoric triester type (U.S. Pat. No. 3,860,559) or two or more combination of those mentioned catalyst (Japanese Patent Laid-Open No. Sho 64-51438). The effect of these polymerization catalysts depends on the types of catalysts. However, to obtain polymer having high molecular weight by using costly polymerization catalyst and reactant monomers in the same molar ratio, it is necessary to carry out the reaction at high temperatures of 200° C. or more for a long time. Thus, even if in the case of using a high boiling point solvent such as N-methyl pyrrolidone, sulfolan and nitrobenzene as a synthesizing solvent, tar-state substance formed by decomposition of monomers and generated resins in reaction vessel, and polymerization catalyst used in a large amount are incorporated into the polymer, which cause unsatisfactory color and deterioration of physical properties of polyamideimide. Moreover, this process is disadvantageous in that it is difficult to give linear polymers having high molecular weights due to side reaction and thereby the solubility of polymers is decreased. Particularly, this process has no economic merit since high costly polymerization catalyst has to be used in a large quantity and the recovery of this catalyst is impossible.

S. Maiti and A. Ray suggested a method for preparing polyamideimide resins which comprises polymerization at 0–5° C. by using N,N-dimethylformamide containing thionyl chloride and lithium chloride as solvents and pyridine as an acid acceptor as disclosed in Makromol. Chem. Rapid Commun. 2, 649–653 (1981). However, this method has no economic merit since costly metal salts are used in the method and polyamideimides having low molecular weights are obtained by the method.

Based on the problems of the above-mentioned processes, the present inventors have made extensive studies in order to solve the problems of the known direct polymerization method and to find a process for preparing polyamideimide resins having high molecular weights with good heat resistance, melt flowability, solubility and economic merit. As the result, the present inventors have now found that by dissolving an aromatic tricarboxylic acid anhydride and an aromatic diamine in a polar solvent, subjecting the resulting diimide dicarboxylic acid to acyl halogenating agent treatment to give an intermediate having good reactivity and then adding diamine as a nucleophilic agent, polyamideimide resins having high molecular weights can be prepared. The present invention has been attained on the basis of this finding.

SUMMARY OF THE INVENTION

It is an object of the present invention to provide a process for preparing polyamideimide resins having high molecular weights with excellent heat resistance and melt flowability.

In an aspect of the present invention, there is provided a process for preparing polyamideimide resins, which comprises dissolving an aromatic tricarboxylic acid anhydride and an aromatic diamine in a polar solvent, subjecting the resulting diimidedicarboxylic acid to acyl halogenating agent treatment to give an intermediate having good reactivity and then adding diamine as a nucleophilic agent to give polyamideimide resins having high molecular weights.

Other objects and advantages will be apparent to those who have ordinary skill in the art from the following description.

DETAILED DESCRIPTION OF THE INVENTION

The present invention relates to a process for preparing polyamideimide resins having high molecular weights.

The procedure for preparing polyamideimide resins having an intrinsic viscosity of 0.1–2.5 dL/g is as follows: Aromatic tricarboxylic acid anhydride and diamine are dissolved in a polar solvent such as N-methyl pyrrolidone and subsequently the solution is subjected to ring closing treatment to give a diimide dicarboxylic acid in gas or solution state while formed water being removed by heating as an azeotrope. Separately, acyl halogenating agent such as thionyl chloride which is polymerization catalyst is dissolved in a polar solvent such as N-methyl pyrrolidone and then the solution is cooled to 10° C. or less to give a complex. After warming to room temperature, solid diimide dicarboxylic acid prepared above or diimidedicarboxylic acid solution in N-methyl pyrrolidone are added to the complex, and reacted at room temperature for about one hour to give an intermediate. After adding diamine, the mixture is subjected to imidization reaction at less than 100° C. for 10 hours to give a polyamideimide resin having intrinsic viscosity of 0.1–2.5 dL/g as measured on a solution of N,N'-dimethylacetamide at a concentration of 0.5 g/dL at 30° C.

The present invention will be explained in detail in the following.

The aromatic tricarboxylic acid anhydride which can be used in the present invention is compounds of formula II (II)

in which

Ar$_1$ is

The diimide dicarboxylic acid which is condensation product of aromatic tricarboxylic acid and diamine can be represented by the formula III (III)

in which

R is

-continued

The diamine usable in the present invention can be represented by the formula IV $$H_2N-Ar_2-NH_2 \qquad (IV)$$

in which $Ar_2$ is

Those compounds may be used as such or in mixtures of two or more, if necessary. Among them, m-phenylene-bis(N-trimellitic imide) prepared by polycondensation of oxy-bis (N-(4-phenylene)-trimellitic imide) (condensation product of trimellitic acid anhydride and 4,4'-diaminodiphenyl ether) with 4,4'-diaminodiphenyl ether, 4,4'-diaminodiphenyl methane, m-phenylenediamine or isophoronediamine is advantageous with respect to physical properties of the prepared resins, such as heat resistance and melt flowability, and cost.

The catalyst used in the present invention include organic or inorganic acyl halogenating agents, for example, thionyl chloride, p-toluene sulfonyl chloride, sulfuryl chloride, cyanuric chloride or phosphorus trichloride. Especially, thionyl chloride is advisable with respect to cost and property.

The polar solvent which can form a complex with organic or inorganic acyl halogenating agent and thus make imidization feasible include N-methyl pyrrolidone, N-methyl imidazole, N-ethyl pyrrolidone, hexamethyl phosphorictriamide, N-ethylalphapyridone, N,N'-dimethylacetamide or N,N'-dimethyl propionamide. Most preferred are N-methyl pyrrolidone, N-methylimidazole and hexamethyl phosphorictriamide.

The acid acceptor used in the present invention is tertiary amine such as pyridine, α-picoline, 2,6-lutidine and triethylamine, and alkylene oxide such as propylene oxide, ethylene oxide and butylene oxide. The acid acceptor reacts with HCl formed during the reaction to give salt or halohydrine compound, resulting in removal of HCl. The amount of used acid acceptor is 1–1.5 mole based on theoretically calculated mole of HCl.

In a process for preparing polyamideimide resins, aromatic tricarboxylic acid and diamine are used in a molar ratio of 1:0.5 to give a diimidedicarboxylic acid and then reacted with diamine in an equimolar amount to give a polyamideimide resin. If necessary, tertiary amine or alkylene oxide may be added at the same time of or after adding diamine. The concentration of the reactants is 5–50% by weight, and preferably 10–20% by weight. When the concentration is less than 5% by weight, the reaction has no economic merit, and when the concentration is above 50% by weight, gelation occurs. The amount of the catalyst used is 170–230 molar percent, preferably 190 to 210 molar percent, based on number of moles used monomers. When the amount of used catalyst exceed the range, polymerization reaction does not proceed. The reaction temperature is selected from the range of 0–100° C. and the reaction time is in a range of 0.5–10 hours. Especially, the reaction is preferred to be carried out at room temperature upto 50° C. for about 2 hours.

The PAI resins prepared by the present invention have an intrinsic viscosity of 0.1 dL/g or more as measured on N,N'-dimethyl acetamide at a concentration of 0.5 g/L at 30° C., and can be used for molding, film and coating as required.

According to the present invention, the process is very advantageous in view of simple reaction, availability and easy handling of monomer and cost for raw materials or process. Moreover, there is no decrease of solubility due to side reaction and no discoloration or deterioration of physical properties due to the incorporation of tar substance. These are to ensure that they can be used not only as thermoplastic casting material, especially as major heat resistant structural material in advanced industries, for example electrical and electronic, and aerospace industries but also as paint, sheet, adhesives, sliding materials, gas separation membrane, fiber and film having heat resistance.

The present invention will now be explained in more detail with reference to the following examples, but it is to be understood that the present invention is not restricted thereto and various modifications are possible within the scope of the invention.

EXAMPLE 1

0.7 kg (3.5 mole) of diaminodiphenyl ether, 0.16 kg (1.5 mole) of m-phenylene diamine, 1.92 kg (10 mole) of trimellitic acid anhydride and 10 liter of N-methyl pyrrolidone were introduced with nitrogen gas being passed slowly through in a 30 liter reactor equipped with a stirrer, a nitrogen inlet, a temperature regulator and a condenser and stirred at room temperature. After 1 hour, 2 liter of xylene was added and heated upto 180° C. The formed water was removed as an azeotope mixture by using Dean-Stark trap and thus the residual diimidedicarboxylic acid mixture was obtained.

On the other hand, 1. 22 kg (10.25 mole) of thionyl chloride and 10 liter of N-methyl pyrrolidone were added with nitrogen gas being passed slowly through in a 25 liter reactor equipped with a stirrer and a nitrogen inlet and cooled to 5° C. or less. After 0.5–1 hour, the solution was warmed to room temperature, poured into the previously prepared dicarboxylic acid-N-methyl pyrrolidone mixture and stirred at 25° C. for 1 hour. To the mixture were added 0.7 kg (3.5 mole) of diaminodiphenyl ether, 0.16 kg (1.5 mole) of m-phenylene diamine and 1.25 liter of N-methyl pyrrolidone, and reacted in the presence of nitrogen gas at room temperature for 2 hours or more. The reaction mixture was precipitated by using excess amount of distilled water in waring blender, filtered and separated. The resulting polymer was washed several times with water and methanol, and then dried in a vacuum drier at 120° C. for 24 hours to give a polyamideimide polymer as a yellow powder. The intrinsic viscosity as measured on a solution of N,N'-dimethyl acetamide at a concentration of 0.5 g/dL at 30° C. was 1.05 dL/g.

The obtained polyamideimide resin was dissolved in N,N'-dimethylacetamide so that the solid content was 10% by weight. The resulting solution was applied onto a glass plate and subjected to curing treatment at 150° C., 250° C. for 1 hour each and 300° C. for 10 hours to give a polyamideimide film having light brown color.

EXAMPLE 2

Dicarboxylic acid was prepared in a manner described in Example 1 except that N-methylimidazole in place of N-methyl pyrrolidone was used as a reaction solvent. On the other hand, 1.90 kg (10.0 mole) of tosyl chloride and 10 liter of N-methyl imidazole were added with nitrogen gas being passed slowly through in a 25 liter reactor equipped with a stirrer and a nitrogen inlet and cooled to 10° C. or less. After 1 hour, the solution was warmed to room temperature, poured into the previously prepared diimide dicarboxylic acid and then stirred at 25° C. for 1 hour. To the mixture were added 0.70 kg (3.5 mole) of diaminodiphenyl ether, and 0.16 kg (1.5 mole) of m-phenylenediamine and 5 liter of N-methyl imidazole, and reacted in a method described in Example 1 to obtain a polyamideimide polymer as a powder. The intrinsic viscosity as measured on a solution of N,N'-dimethylacetamide at a concentration of 0.5 g/dL at 30° C. was 0.95 dL/g.

EXAMPLE 3

0.63 kg (3.15 mole) of diaminodiphenyl ether, 0.15 kg (1.35 mole) of m-phenylene diamine, 1.73 kg (9.0 mole) of trimellitic acid anhydride and 10 liter of N-methyl pyrrolidone were introduced into the same reactor as in Example 1, stirred at room temperature upto 180° C. over 1 hour and subjected to imidization to give a diimide dicarboxylic acid mixture.

On the other hand, 1–10 kg (9.23 mole) of thionyl chloride and 10 liter of N-methyl pyrrolidone were added with nitrogen gas being passed slowly through in a 25 liter reactor equipped with a stirrer and a nitrogen inlet and cooled to 5° C. or less. After 1 hour, the solution was warmed to room temperature, and stirred at room temperature for 1.5 hours together with 0.38 kg (2 mole) of trimellitic acid anhydride. To the solution were added 0.63 kg (3.15 mole) of diaminodiphenyl ether and 0.15 kg (1.35 mole) of m-phenylene diamine, and reacted in a method described in Example 1 to give a polyamideimide polymer as a powder. The intrinsic viscosity as measured on a solution of N,N'-dimethylacetamide at a concentration of 0.5 g/dL at 30° C. was 0.72 dL/g.

EXAMPLE 4

1.00 kg (5 mole) of diaminodiphenyl ether, 1.92 kg (10 mole) of trimellitic acid anhydride and 12 liter of m-cresol were introduced into the same reactor as in Example 1, and warmed to 80–90° C. with stirring. An hour later, 2 liter of toluene was added and heated upto 160° C., removing formed water as an azeotrope. The resulting precipitate formed by cooling was filtered, washed twice or three times with methanol and acetone and then dried in a vacuum drier at 120° C. for 24 hours to give 2.67 kg of oxy-bis(N-phenylene)-trimellitic imide) with a melting point of 374° C. in a yield of 97.5%. In addition, 0.54 kg (5 mole) of m-phenylene diamine, 1.92 kg (10 mole) of trimellitic acid anhydride and 18 liter of m-cresol were introduced into the same reactor as in Example 1 and reacted in the same manner as described above to give 2.05 kg of m-phenylene-bis(N-trimellitic imide) with a melting point of 398° C. in a yield of 90%.

On the other hand 1.18 kg (10.0 mole) of thionyl chloride and 20 liter of N-methyl pyrrolidone were added with nirogen gas being passed slowly through in a 30 liter reactor equipped with a stirrer, a nitrogen inlet and a condenser, and cooled to 5° C. or less. After 1 hour, the solution was warmed to room temperature. To the solution were added previously prepared oxy-bis(N-(4-phenylene)-trimellitic imide) and 10 liter of N-methyl pyrrolidone, and stirred at room temperature for 1 hour. To the mixture were added 0.70 kg (3.5 mole) of diaminodiphenyl ether and 0.16 kg (1.5 mole) of m-phenylene diamine and 10 liter of N-methyl pyrrolidone and stirred vigorously at room temperature over 2 hours. The procedure of Example 1 was repeated to give a polyamideimide powder. The intrinsic viscosity as measured on a solution of N,N'-dimethyl acetamide at a concentration of 0.5 g/dL at 30° C. was 0.85 dL/g.

EXAMPLE 5

Oxy-bis(N-(4-phenylene)-trimellitic imide) was prepared in a manner described in Example 4. Separately, 0.85 kg (5 mole) of isoprenediamine was dissolved in 8 liter of N,N'-dimethylacetamide and then cooled to 10° C. or less. 1.93 kg (10.05 mole) of trimellitic acid anhydride was added while maintaining at room temperature, and stirred over 5–6 hours. To the mixture were added 1.2 liter of acetic acid anhydride and 0.3 liter of pyridine, and reacted at 150° C. for 5 hours and cooled. The reaction, mixture was precipitated in distilled water and washed several times with methanol to give 1.55 kg of diimidedicarboxylic acid containing isoprenediamine structure in a yield of 60%.

On the other hand, 1.22 kg (10.25 mole) of thionyl chloride and 10 liter of N-methyl pyrrolidone were added with nitrogen gas being passed slowly through in a 30 liter reactor equipped with a stirrer, a nitrogen inlet and a condenser, and cooled to 5° C. or less. After 1 hour, the solution was warmed to room temperature. To the mixture were added 1.55 kg (3 mole) of previously prepared diimidedicarboxylic acid, 1.09 kg (2 mole) of oxy-bis(N-(4-phenylene)-trimellitic imide) and 10 liter of N-methyl pyrrolidone and stirred at room temperature for 1 hour. Subsequently, 1.00 kg (5 mole) of diaminodiphenyl ether was introduced to the mixture and stirred at 25–50° C. for 2 hours. The procedure of Example 1 was repeated to give a polyamideimide resin. The intrinsic viscosity as measured on a solution of N,N'-dimethylacetamide at a concentration of 0.5 g/dL at 30° C. was 0.65 dL/g.

EXAMPLE 6

Dicarboxylic acid was prepared using N-methylimidazole in place of N-methyl pyrrolidone as a reaction solvent in the same manner described in Example 1. On the other hand, 1.18 kg (10.0 mole) of thionyl chloride and 10 liter of hexamethyl phosphoric triamide were added with nitrogen gas being passed slowly through in a 25 liter reactor equipped with a stirrer and a nitrogen inlet and cooled to 5° C. or less. After 1 hour, the solution was warmed to room temperature, poured into the previously prepared diimide dicarboxylic acid and then stirred at 25° C. for 2 hours. To the mixture were added 0.70 kg (3.5 mole) of diaminodiphenyl ether, 0.16 kg (1.5 mole) of m-phenylene diamine and 5 liter of hexamethyl phosphorictriamide and reacted at 70° C. for 3 hours. The procedure of Example 1 was repeated to give a polyamideimide resin. The intrinsic viscosity as measured on a solution of N,N'-dimethyl acetamide at a concentration of 0.5 g/dL at 30° C. was 0.88 dL/g.

EXAMPLE 7

Diimidedicarboxylic acid was prepared in a manner described in Example 1. On the other hand, 1.22 kg (10.25 mole) of thionyl chloride and 10 liter of N-methyl pyrrolidone were added with nitrogen gas being passed slowly through in a 25 liter reactor equipped with a stirrer and a nitrogen inlet and cooled to 5° C. or less. After 1 hour, the solution was warmed to room temperature, poured into the previously prepared diimidedicarboxylic acid and then stirred at 25° C. for 1 hour. To the mixture were added 0.70 kg (3.5 mole) of diaminodiphenyl ether, 0.16 kg (1.5 mole) of m-phenylene diamine and 5 liter of N-methyl pyrrolidone, and reacted at 50° C. or less for 2 hours. After cooling, the same procedure of Example 1 was repeated to give a polyamideimide polymer. The intrinsic viscosity as measured on a solution of N,N'-dimethyl acetamide at a concentration of 0.5 g/dL at 30° C. was 1.52 dL/g.

EXAMPLE 8

Oxy-bis(N-(4-phenylene)-trimellitic imide) and m-phenylene bis-(N-trimellitic imide) as diimide dicarboxylic acids were prepared in a manner described in Example 4. Separately, 1.93 kg (10.1 mole) of tosyl chloride and 20 liter of N-methyl pyrrolidone were added with nitrogen gas being passed slowly through in a 30 liter reactor equipped with a stirrer, a nitrogen inlet and a condenser and cooled to 10° C. or less. After 1 hour, the solution was warmed to room temperature, poured into the previously prepared 1.92 kg (3.5 mole) of oxy-bis(N-(4-phenylene)-trimellitic imide), 0.68 kg (1.5 mole) of m-phenylene bis-(N-trimellitic imide) and 10 liter of N-methyl pyrrolidone, and stirred at room temperature for 3 hours. Subsequently, 1.28 kg (22.0 mole) of propylene oxide was added and stirred at room temperature for 3 hours. The procedure of Example 1 was repeated to give a polyamideimide resin in a powder form. The intrinsic viscosity as measured on a solution of N,N'-dimethylacetamide at a concentration of 0.5 g/dL at 30° C. was 1.29 dL/g.

COMPARATIVE EXAMPLE 1

Diimidedicarboxylic acid mixture was prepared in a manner described in Example 1. To the mixture were added 20 liter of N-methyl pyrrolidone, 0.70 kg (3.5 mole) of diaminodiphenyl ether and 0.16 kg (1.5 mole) of m-phenylene diamine without being added acyl halogenating agent and reacted at room temperature for 3.5 hours. Subsequently, the procedure of Example 1 was repeated, however the desired polyamideimide polymer was not obtained.

COMPARATIVE EXAMPLE 2

Diimidedicarboxylic acid mixture was prepared in a manner described in Example 1. Separately, 1.78 kg (15.0 mole) or thionyl chloride and 10 liter of N-methyl pyrrolidone were added with nitrogen gas being passed slowly through in a 25 liter reactor and cooled to 5° C. or less. After 1 hour, the solution was warmed to room temperature, and poured into the previously prepared diimide dicarboxylic acid with stirring. Subsequently, the procedure of Example 1 was repeated, however the desired polyamideimide polymer was not obtained.

COMPARATIVE EXAMPLE 3

A polyamideimide resin was prepared in a manner described in Example 1 except that N,N'-dimethylformamide was used as a solvent. The intrinsic viscosity as measured on a solution of N,N'-dimethyl acetamide at a concentration of 0.5 g/dL at 30° C. was 0.09 dL/g.

COMPARATIVE EXAMPLE 4

Oxy-bis(N-(4-phenylene)-trimellitic imide) and m-phenylene bis-(N-trimellitic imide) as diimidedicarboxylic acids were prepared in a manner described in Example 4. Separately, 1.22 kg (10.25 mole) of thionyl chloride and 10 liter of N-methyl pyrrolidone were added with nitrogen gas being passed slowly through in a 30 liter reactor equipped with a stirrer, a nitrogen inlet and a condenser and cooled to 5° C. or less. After 1 hour, the solution was warmed to room temperature, poured into the previously prepared 1.72 kg (3.5 mole) of oxy-bis(N-(4-phenylene)-trimellitic imide), 0.68 kg (1.5 mole) of m-phenylene bis-(N-trimellitic imide) and 10 liter of N-methyl pyrrolidone and stirred at room temperature for 30 minutes. To the mixture were added 0.70 kg (3.5 mole) of diaminodiphenyl ether, 0.16 kg (1.5 mole) of m-phenylene diamine and 1.25 liter of N-methyl pyrrolidone and stirred at 150° C. for 2 hours. Subsequently, the procedure of Example 1 was repeated to give a polyamideimide polymer as a powder. The intrinsic viscosity as measured on a solution of N,N'-dimethylacetamide at a concentration 0.5 g/dL at 30° C. was 0.35 dL/g.

Table 1 below shows the polymerization condition and general physical properties of the PAI resins prepared in the Examples.

TABLE 1

| Property | | No. EXAMPLE | | | | | | | |
|---|---|---|---|---|---|---|---|---|---|
| | | 1 | 2 | 3 | 4 | 5 | 6 | 7 | 8 |
| CONDITION | Trimellitic acid anhydride (mole) | 10.0 | 10.0 | 9.0 | 10.0 | 10.0 | 10.0 | 10.0 | 10.0 |
| | Diamine (mole) ODA/m-PDA = 7:3 | 5.0 | 5.0 | 4.5 | 5.0 | IPDA ODA (5.0) | 5.0 | 5.0 | 5.0 |
| | Dicarboxylic acid separation | X | X | X | ○ | ○ | X | X | ○ |
| | End capping agent (mole) | — | — | TMA 2.0 | — | — | — | — | — |
| | Acyl halogenating agent (mole) | TC 10.25 | TsCl 10.0 | TC 9.23 | TC 10.0 | TC 10.25 | TC 10.0 | TC 10.25 | TsCl 10.0 |
| | Solvent (L) | NMP 21.25 | NMI 25 | NMP 20.0 | NMP 40.0 | NMP 25.0 | HMPA 25.0 | NMP 21.25 | NMP 40.0 |
| | Acid acceptor (mole) | — | — | — | — | — | — | TEA 20 | PO 22 |
| | Diamine (mole) ODM/m-PDA = 7:3 | 5.0 | 5.0 | 4.5 | 50 | ODA 5.0 | 5.0 | 5.0 | 5.0 |
| | Temperature (° C.) | 25 | 25 | 25 | 25 | 25–50 | 70 | 25–50 | 25 |
| Glass Transition Temperature | | 276 | 274 | 270 | 278 | 260 | 276 | 285 | 280 |
| Tensile strength (kg/cm²) | | 1366 | 1350 | 1348 | 1401 | 1205 | 1336 | 1438 | 1420 |
| Intrinsic viscosity (dL/g) N,N'-dimethylacetamide | | 1.05 | 0.83 | 0.72 | 0.95 | 0.65 | 0.88 | 1.52 | 1.29 |
| Molecular Weight | Mn (× 10³) | 4.52 | 3.96 | 3.40 | 4.40 | 3.26 | 4.01 | 5.23 | 4.82 |
| | Mw (× 10³) | 13.51 | 11.45 | 9.50 | 12.23 | 8.72 | 11.93 | 17.52 | 13.59 |
| | Distribution (Mw/Mn) | 2.99 | 2.89 | 2.80 | 2.78 | 2.67 | 2.98 | 3.35 | 2.82 |

TABLE 1-continued

| Property | | No. COMPARATIVE EXAMPLE | | | |
|---|---|---|---|---|---|
| | | 1 | 2 | 3 | 4 |
| CONDITION | Trimellitic acid anhydride (mole) | 10.0 | 10.0 | 10.0 | 10.0 |
| | Diamine (mole) ODA/m-PDA = 7:3 | 5.0 | 5.0 | 5.0 | 5.0 |
| | Dicarboxylic acid separation | X | X | X | ○ |
| | End capping agent (mole) | — | — | — | — |
| | Acyl halogenating agent (mole) | — | TC 15.0 | TC 10.25 | TC 10.25 |
| | Solvent (L) | NMP 20.0 | NMP 20.0 | DMF 21.25 | NMP 21.25 |
| | Acid acceptor (mole) | — | — | — | — |
| | Diamine (mole) ODA/m-PDA = 7:3 | 5.0 | 5.0 | 5.0 | 5.0 |
| | Temperature (° C.) | 25 | 25 | 25 | 25 |
| Glass Transition Temperature | | — | — | — | 262 |
| Tensile strength (kg/cm$^2$) | | — | — | — | FRAGILE |
| Intrinsic viscosity (dL/g) N N'-dimethylacetamide | | — | — | 0.09 | 0.35 |
| Molecular Weight | Mn (× 10$^3$) | — | — | 1.32 | 1.82 |
| | Mw (× 10$^3$) | — | — | 7.66 | 13.3 |
| | Distribution (Mw/Mn) | — | — | 5.80 | 7.30 |

(note) ODA: 4,4'-diaminodiphenyl ether
m-PDA: m-phenylene diamine
TC: thionyl chloride
NMP: N-methyl pyrrolidone
TMA: trimellitic acid anhydride
IPDA: isophorone diamine As seen from Table 1, the polyamideimide resins according to the present invention were polymers having high molecular weights with an intrinsic viscosity of 0.6 dL/g or more. The tensile strengths of the resins measured in a film state were in a range of 1,205 to 1,438 kg/cm$^2$, which showed considerably good mechanical strength.

In order to determine the thermal properties of the PAI resins according to the present invention, heat stability and glass transition temperatures were measured by a thermogravimetric analysis (TGA) and a differential scanning calorimeter (DSC).

The glass transition temperature of polyamideimide resins are in the range of 260–285° C., which are similar to those of typical commercial polyamideimide resin, Torlon®.

Figure 1:
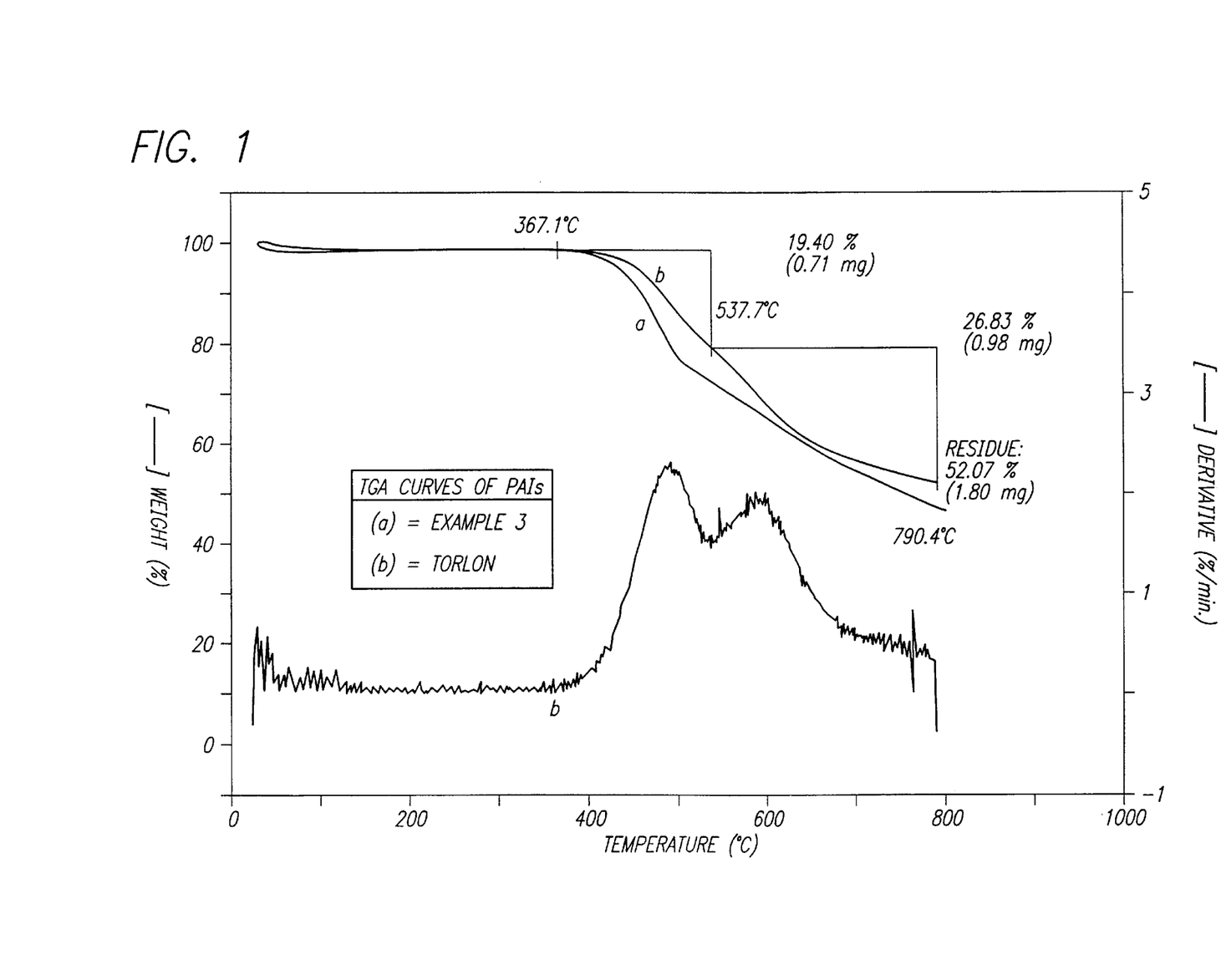
FIG. 1 shows thermogravimetric analysis curves of the polyamideimide resin prepared by the present invention.

FIG. 1 shows thermogravimetric analysis curves of Torlon® and polyamideimide resins prepared in Example 1 having a remain weight of 52.5% at 800° C. and 10% weight loss temperature of 480° C., which shows relatively good heat stability not inferior to that of Torlon®.

The condition for determining the molecular weight of the prepared polyamideimide (number average molecular weight, weight average molecular weight, distribution) are as follows: (Calculated in terms of polystyrene)

Figure 2:
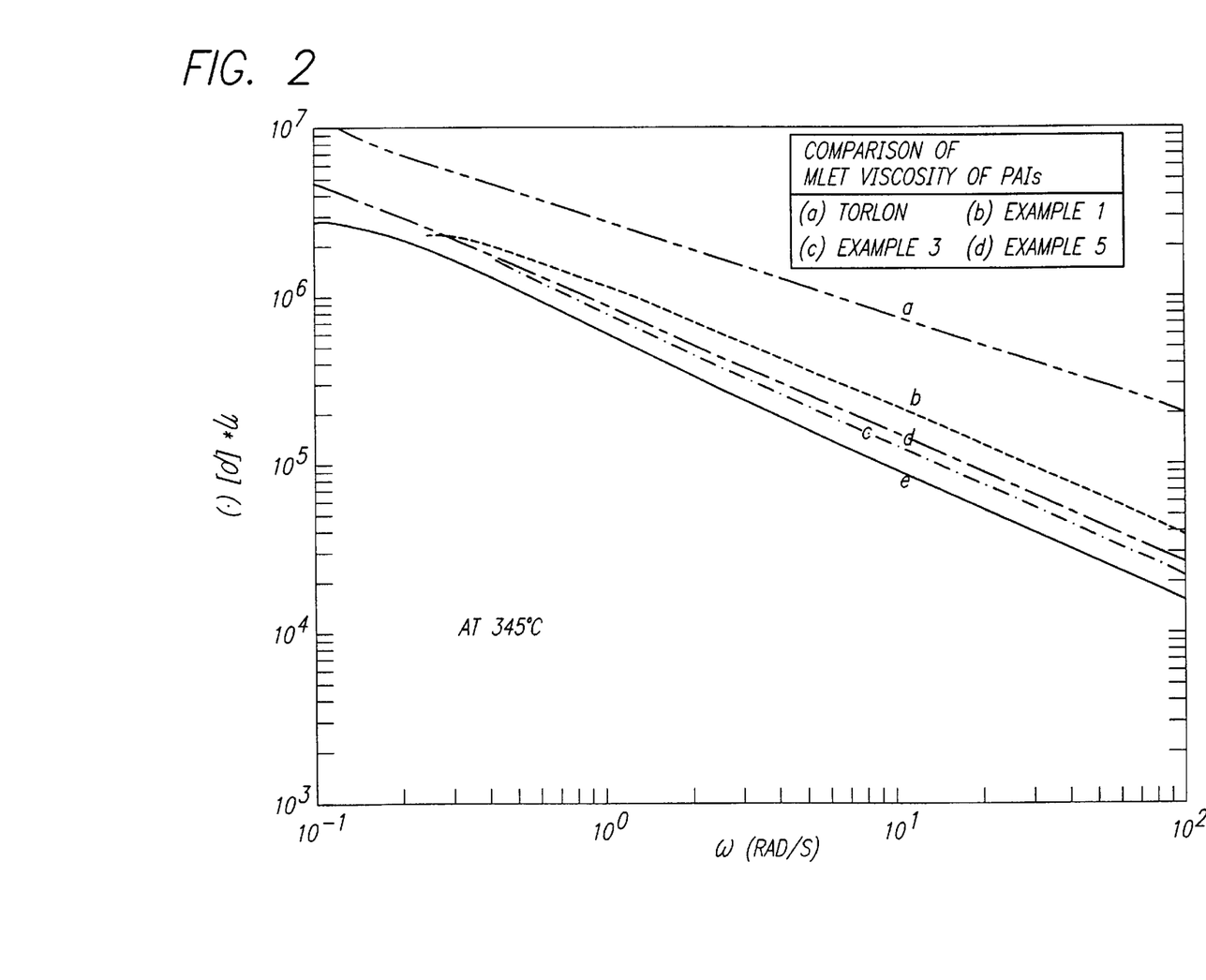
FIG. 2 shows melt viscosity comparison curves between polyamideimide resins prepared by the present invention and the conventional polyaimideimide, <Torlon®>.
Figure 3:
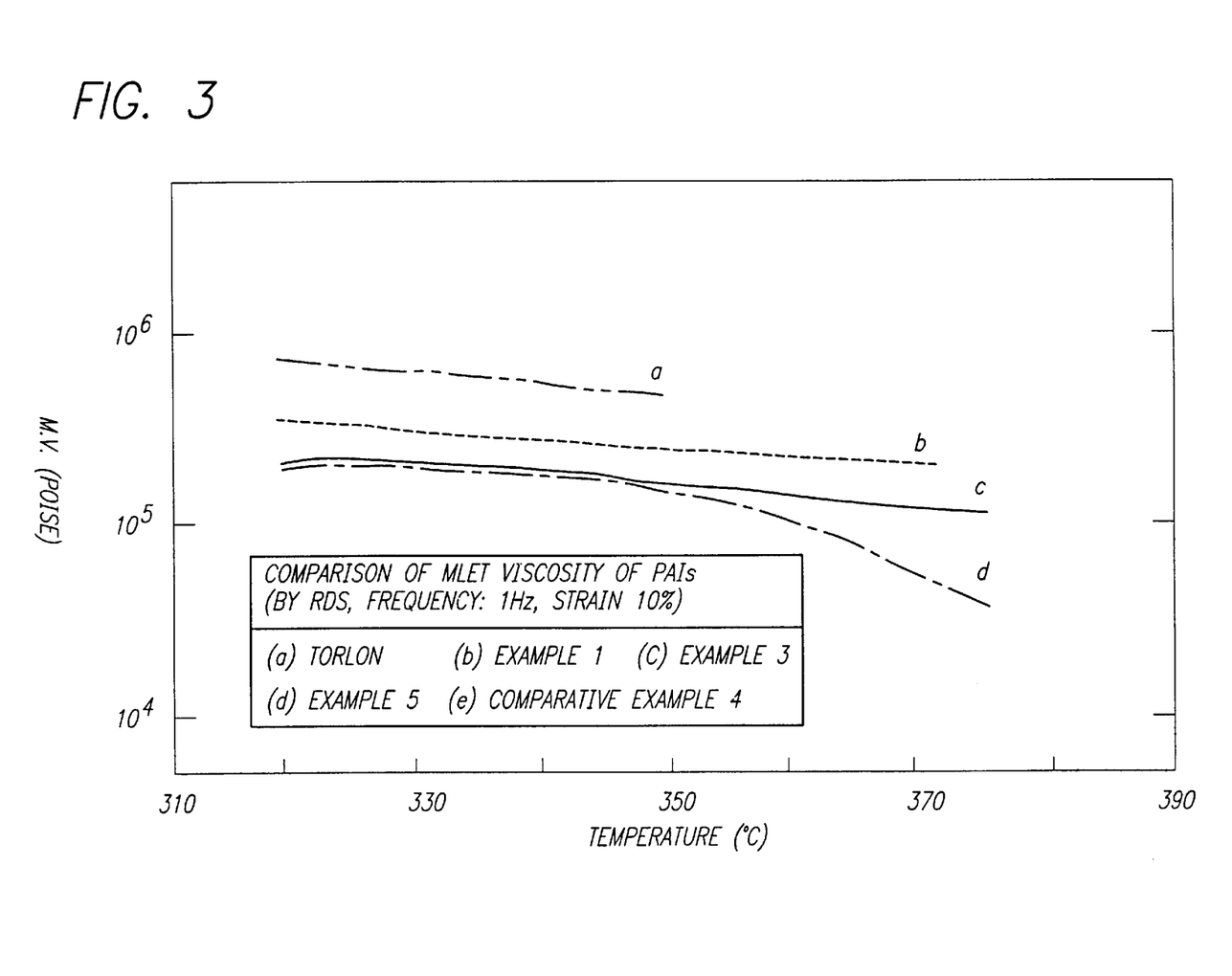
FIG. 3 shows the change of melt viscosity versus temperature for polyamideimide resins prepared by the present invention and the convetional polyamideimide, <Torlon®>.

Detector: SP 8450 Variable UV Detector (280 nm)
Column: Tosoh company
TSK gel G6000H$_{XL}$-GMH$_{XL}$-G2500H$_{XL}$
Solvent: Dimethylformamide/0.03 M LiBr/1 vol % Tetrahydrofuran
Flow Rate: 0.5 ml/min
Standard: Polystyrene The melt viscosity of the polyamideimide resins was measured by a Rheometrics Dynamics Spectrometer(RDS) to determine the processability of the polyamideimide resins according to the present invention. The evaluation results are shown in FIGS. 2 and 3.

The determination of the melt viscosity of the polyamideimide resins was carried out as follows: At first, polyamideimide resins in a powder state were hot pressed to give a parallel plate (diameter: 35 mm, thickness: 2 mm). After heating the sample to 330° C., the melt viscosity of the polyamideimide resins was measured at the same temperature while the frequency was changed through a range of 0.1 to 500 rad/sec. Stress was fixed at 10%. In addition, in order to observe the change of melt viscosity according to the temperature increase, the melt viscosity was measured at a temperature range of 300° C. to 370° C. using the same sample as mentioned above. The polyamideimide resins according to the present invention have a melt viscosity which is much lower than that of Torlon® under the same condition, and thus show preferable processability.

What is claimed is:

1. A process for preparing polyamideimide resin having a high molecular weight, the process consisting essentially of:
   (a) condensation of an aromatic tricarboxylic acid anhydride with an aromatic diamine in a polar solvent to yield a diimidedicarboxylic acid,
   (b) dissolving an acyl halogenating agent in a solvent to yield an agent-solvent solution, and cooling the resulting agent-solvent solution to yield a complex,
   (c) reacting the diimidedicarboxylic acid from step (a) with the complex from step (b) to give an intermediate, and
   (d) then subjecting the intermediate to direct polymerization by using diamine to give a polyamideimide resin having a high molecular weight.

2. A process according to claim 1, wherein the acyl halogenating agent is selected from the group consisting of organic and inorganic acyl halogenating agents.

3. A process according to claim 1, wherein the diimidedicarboxylic acid is a monomer, and wherein the acyl halogenating agent is employed in an amount ranging from 170 to 230 molar percent, based on the number of moles of monomer used.

4. A process according to claim 1, wherein the intermediate and the diamine in step (c) are reactants, wherein the polymerization reaction is carried out using the reactants in a concentration of 5–50% by weight at a temperature of 0–100° C. over a period of 0.5–10 hours, and wherein the resulting polyamideimide resin has an intrinsic viscosity of 0.1–2.5 dL/g as measured on a solution of N,N'-dimethylacetamide as a solvent at a concentration of 0.5 g/dL at 30° C.

5. A process according to claim 1, wherein the polar solvent which can form a complex with organic or inorganic acyl halogenating agent at 0–10° C. and thus make imidization feasible is selected from the group consisting of N-methyl pyrrolidone, N-methyl imidazole, N-ethyl pyrrolidone, hexamethyl phosphoric triamide, N-ethylalphapyridone, N,N'-dimethylacetamide, and N,N'-dimethyl propionamide.

6. A process according to claim 2, wherein the acyl halogenating agent is selected from the group consisting of thionyl chloride, p-toluenesulonyl chloride, sulfuryl chloride, cyanuric chloride, and phosphorus trichloride.

7. A process as claimed in claim 1, wherein the diimidedicarboxylic acid is a monomer; wherein the acyl halogenating agent is employed in an amount ranging from 170 to 230 molar percent based on the number of moles of monomer used; wherein the acyl halogenating agent is selected from the group consisting of thionyl chloride, p-toluenesulonyl chloride, sulfuryl chloride, cyanuric chloride, and phosphorus trichloride; and wherein the polar solvent is selected from the group consisting of N-methyl pyrrolidone, N-methyl imidazole, N-ethyl pyrrolidone, hexamethyl phosphoric triamide, N-ethylalphapyridone, N,N'-dimethylacetamide, and N,N'-dimethyl propionamide.

8. A process as claimed in claim 1, wherein the diimidedicarboxylic acid is a monomer; wherein the acyl halogenating agent is employed in an amount ranging from 170 to 230 molar percent based on the number of moles of monomer used; wherein the acyl halogenating agent is selected from the group consisting of thionyl chloride, p-toluenesulonyl chloride, sulfuryl chloride, cyanuric chloride, and phosphorus trichloride; and wherein the polar solvent is selected from the group consisting of N-methyl pyrrolidone, N-methyl imidazole, N-ethyl pyrrolidone, hexamethyl phosphoric triamide, N-ethylalphapyridone, N,N'-dimethylacetamide, and N,N'-dimethyl propionamide.

9. A process for preparing polyamideimide resin having a high molecular weight, the process comprising:
  (a) condensation of an aromatic tricarboxylic acid anhydride with an aromatic diamine in a polar solvent to yield a diimidedicarboxylic acid;
  (b) dissolving an acyl halogenating agent in a solvent to yield an agent-solvent solution, and cooling the resulting agent-solvent solution to yield a complex,
  (c) reacting the diimidedicarboxylic acid from step (a) with the complex from step (b) to give an intermediate; and
  (d) then subjecting the intermediate to direct polymerization by using diamine to give a polyamideimide resin having a high molecular weight.

10. A process as claimed in claim 9, wherein the polar solvent is selected from the group consisting of N-methyl pyrrolidone, N-methyl imidazole, N-ethyl pyrrolidone, hexamethyl phosphoric triamide, N-ethylalphapyridone, N,N'-dimethylacetamide, and N,N'-dimethyl propionamide.

11. A process as claimed in claim 10, wherein the acyl halogenating agent is employed in an amount ranging from 170 to 230 molar percent based on the number of moles of monomer used, and wherein the acyl halogenating agent is selected from the group consisting of thionyl chloride, p-toluenesulonyl chloride, sulfuryl chloride, cyanuric chloride, and phosphorus trichloride.

12. A process as claimed in claim 11, wherein the agent-solvent solution is cooled to 10° C. or less to yield the complex.

13. A process as claimed in claim 9, wherein the diimidedicarboxylic acid and the complex in step (c) react at room temperature.

14. A process as claimed in claim 11, wherein the intermediate and the diamine in step (d) are reactants, wherein the polymerization reaction is carried out using the reactants in a concentration of 5–50% by weight at a temperature of 0–100° C. over a period of 0.5–10 hours, and wherein the resulting polyamideimide resin has an intrinsic viscosity of 0.1–2.5 dL/g as measured on a solution of N,N'-dimethylacetamide as a solvent at a concentration of 0.5 g/dL at 30° C.

15. A process as claimed in claim 14, wherein the resulting polyamideimide resin has an intrinsic viscosity of 0.65–2.5 dL/g as measured on a solution of N,N'-dimethylacetamide as a solvent at a concentration of 0.5 g/dL at 30° C.

16. A process as claimed in claim 9, wherein prior to step (d) the intermediate is mixed with an acid acceptor, wherein the acid acceptor comprises a tertiary amine.

17. A process as claimed in claim 9, wherein the acyl halogenating agent is selected from the group consisting of thionyl chloride, p-toluenesulonyl chloride, sulfuryl chloride, cyanuric chloride, and phosphorus trichloride.

18. A process as claimed in claim 9, wherein the acyl halogenating agent is employed in an amount ranging from 170 to 230 molar percent based on the number of moles of monomer used.

19. A process as claimed in claim 1, wherein the solvent in step (b) is a polar solvent selected from the group consisting of N-methyl pyrrolidone, N-methyl imidazole, N-ethyl pyrrolidone, hexamethyl phosphoric triamide, N-ethylalphapyridone, N,N'-dimethylacetamide, and N,N'-dimethyl propionamide.

20. A process as claimed in claim 9, wherein the solvent in step (b) is a polar solvent selected from the group consisting of N-methyl pyrrolidone, N-methyl imidazole, N-ethyl pyrrolidone, hexamethyl phosphoric triamide, N-ethylalphapyridone, N,N'-dimethylacetamide, and N,N'-dimethyl propionamide.

21. A process as claimed in claim 1, wherein the agent-solvent solution is cooled to 10° C. or less to yield the complex.

22. A process as claimed in claim 1, wherein the diimidedicarboxylic acid and the complex in step (c) react at room temperature.

23. A process as claimed in claim 1, wherein prior to step (d) the intermediate is mixed with an acid acceptor, wherein the acid acceptor comprises a tertiary amine.

* * * * *